(12) United States Patent
Noda

(10) Patent No.: US 9,049,181 B2
(45) Date of Patent: Jun. 2, 2015

(54) NETWORK KEY UPDATE SYSTEM, A SERVER, A NETWORK KEY UPDATE METHOD AND A RECORDING MEDIUM

(75) Inventor: Jun Noda, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 400 days.

(21) Appl. No.: 13/496,842

(22) PCT Filed: Sep. 14, 2010

(86) PCT No.: PCT/JP2010/066273
§ 371 (c)(1),
(2), (4) Date: Mar. 16, 2012

(87) PCT Pub. No.: WO2011/034196
PCT Pub. Date: Mar. 24, 2011

(65) Prior Publication Data
US 2012/0179902 A1    Jul. 12, 2012

(30) Foreign Application Priority Data
Sep. 18, 2009   (JP) ................................ 2009-217801

(51) Int. Cl.
```
H04L 29/06    (2006.01)
G06F 21/60    (2013.01)
G06F 21/72    (2013.01)
G06F 21/73    (2013.01)
H04L 9/08     (2006.01)
```
(52) U.S. Cl.
CPC ............. *H04L 63/068* (2013.01); *H04L 63/065* (2013.01); *G06F 21/602* (2013.01); *G06F 21/72* (2013.01); *G06F 21/73* (2013.01); *G06F 2221/2107* (2013.01); *H04L 9/0822* (2013.01); *H04L 9/0833* (2013.01); *H04L 9/0891* (2013.01); *H04L 63/06* (2013.01); *G06F 2221/2129* (2013.01)

(58) Field of Classification Search
None
See application file for complete search history.

(56) References Cited

U.S. PATENT DOCUMENTS 8,370,638 B2 *  2/2013  Duane et al. .................. 713/185
2008/0019528 A1 *  1/2008  Kneissler ...................... 380/279

FOREIGN PATENT DOCUMENTS

JP  2003229844 A  8/2003
JP  2007538454 A  12/2007

OTHER PUBLICATIONS

Communication dated Apr. 8, 2014 from the Japanese Patent Office in counterpart Japanese application No. 2011-531993.
(Continued)

Primary Examiner — Jung Kim
Assistant Examiner — Tri Tran
(74) Attorney, Agent, or Firm — Sughrue Mion, PLLC

(57) ABSTRACT

In order to reduce the frequency with which communication occurs when updating a network key is reduced and minimize the deterioration in performance due to updating without relying on a key tree, a server is provided with an address key allocation unit which generates identifiers for identifying clients by the combination of addresses on a plurality of address spaces and allocates address keys to respective addresses included in the generated identifier, and a network key ciphering unit which generates a network key update key which cannot be generated from the address keys allocated to a client to be disconnected, ciphers a new network key using the network key update key, and delivers the new network key to the clients.

15 Claims, 12 Drawing Sheets

(56) References Cited

OTHER PUBLICATIONS

Jun Noda et al., "Proposal and Evaluation of a Group Key Management Scheme for Ad-hoc Sensor Networks", IEICE Technical Report, Japan, The Institute of Electronics Information and Communication Engineers,, Oct. 15, 2009, vol. 109, No. 248, p. 1-6.

Yuta Oami, et al., "A General-Purpose Key Management Scheme for Sensor Networks", 2009 Symposium on Cryptography and Information Security,Japan, Technical Committee on Information Security of the Institute of Electronics, Information and Communication Engineers, Jan. 23, 2009, 3D4-1, p. 1-6.

Hisashi Mohri et al., "A Key Management Scheme for sensor Networks Utilizing Multiple Attribute Partitions", 2007 Symposium on Cryptography and Information Security, Japan, The Institute of Electronics, Information and Communication Engineers, Jan. 23, 2007, 3F2-4, p. 1-6.

Jun Noda et al., "A Scalable Server Data Authentication Scheme for Sensor Networks", IEICE Technical Report, Japan, The Institute of Electronics, Information and Communication Engineers, Jul. 10, 2008, vol. 108, No. 138, p. 1-6.

Jun Noda, Yuichi Kaji, and Toshiyasu Nakao, "A Scalable Server Data Authentication Scheme for Sensor Networks", Information Processing Society of Japan Research Report, Japan, Corporation Information Processing Society of Japan, Jul. 10, 2008, vol. 2008, No. 66, p. 1-6.

* cited by examiner

IDENTIFIER OF CLIENT 200
(1-1, 2-q, 3-2)

IDENTIFIER OF GROUP INCLUDING CLIENT 200
(1-1, 2-q, *)  (1-1, *, 3-2)
(*, 2-q, 3-2)  (1-1, *, *)
(*, *, 3-2)    (*, 2-q, *)

ADDRESS KEY OF CLIENT 200

(K(1-1), K(2-q), K(3-2))

ADDRESS KEY SHARED BY GROUP INCLUDING CLIENT 200

(K(1-1), K(2-q))   (K(1-1), K(3-2))
(K(2-q), K(3-2))        K(1-1)
     K(3-2)              K(2-q)

| FLOOR \ BUILDING | BUILDING A | BUILDING B | BUILDING C | BUILDING D |
|---|---|---|---|---|
| THIRD FLOOR | | 1 | 2 | |
| SECOND FLOOR | 3 | 4 | | 5 |
| FIRST FLOOR | 6 | 7 | 8 | 9 |

NETWORK KEY UPDATE SYSTEM, A SERVER, A NETWORK KEY UPDATE METHOD AND A RECORDING MEDIUM

CROSS REFERENCE TO RELATED APPLICATIONS

This application is a National Stage of International Application No. PCT/JP2010/066273 filed Sep. 14, 2010, claiming priority based on Japanese Patent Application No. 2009-217801, filed Sep. 18, 2009, the contents of all of which are incorporated herein by reference in their entirety.

TECHNICAL FIELD

The present invention relates to a network key update system, a server, a network key update method and a recording medium which, when a client is disconnected from a network, update a network key used in order to participate in the network.

BACKGROUND ART

Like a sensor network, there exists a system in which a large number of clients installed in a various environment collect information and upload information in a server for information collection via a network. Such a system can grasp information of a remote location from a client which is installed in the environment via a network. Also, by using such a system, it is possible to improve operation efficiency compared with a method in which a person patrols each location and manages it.

For example, an example of a sensor network is disclosed in Patent document 1. FIG. 14 is an explanatory drawing showing an example of the sensor network disclosed in Patent document 1. As shown in FIG. 14, a sensor network 900 disclosed in Patent document 1 includes a plurality of sensor devices (client) 901 . . . equipped with a wireless communication function and external applications (server) 921, 922, 923 . . . .

A purpose of use of the sensor network 900 is diverse. The sensor network 900 can be used for all the fields such as crime prevention, disaster prevention, nursing, energy conservation, wide area measurement and tracing. For example, in the field of nursing, the sensor network 900 can monitor using a sensor device 901 heart rate, body temperature, posture, movement of hand and foot, emergency and so on. Here, the sensor device 901 often does not hold high processing power in the device itself because of problems for its production cost and electric power consumption.

A sensor network including a structure mentioned above operates as follows. That is, in the sensor network, when a server collects data from a large number of clients installed in a wide range in the environment, the server establishes a path to the clients by wireless communication, and the clients transmit information via the established wireless communication path.

In an operation of this sensor network, a network key is shared by all the clients belonging to the network, and appropriateness to participate in the network is often judged based on whether the network key is possessed or not. In such an operation, in case necessity occurs to disconnect a specific client from the network, disabling the network key which the client possesses will become a problem. A network key update method related with such a problem is disclosed in Non-patent document 1. A related method 1 disclosed in Non-patent document 1 encrypts in advance, between the server and an arbitrary client, a network key for each client using a key shared one to one (terminal unique key) and distributes the encrypted network key to each terminal separately.

Also a related method 2 disclosed in Non-patent document 2 reduces a number of communications used for network key distribution using a tree structure called a key tree. In the method, a key is allocated to each vertex of the key tree.

In the method, a leaf and a client correspond one to one, and a key is defined for each parent vertex in a bottom-up way from leaves. Also, the client possesses all the keys of its ancestor. At this time, because all the clients share a key of a root of the key tree, the key of the root is used as a network key.

In this method, when a client is disconnected, the keys which the disconnected node holds are all updated. At this time, this method selects a vertex among vertices other than those become the ancestor of the client to be disconnected and from vertices near the root of the key tree in top-down way; and divides the key tree into subtrees which have each selected vertex as a root.

This method aims at efficient realization of key update by sending information in a simultaneous forwarding way to each subtree divided using a key which is allocated to the root.

Further, it is often assumed that information stored in a server and a client secretly is managed safely by an operation such as using a tamper resistant device (that is, a device which is very difficult to leak the internal classified information unlawfully) disclosed, for example, in Patent document 2. In the following, in case there is a description to store secretly, it is supposed that the information is stored secretly under the assumption that unlawful leak is very difficult by such the operation.

Also, a related technology is disclosed in Patent document 3. The technology disclosed in Patent document 3 is a method which, by structuring a key shared between a server and a node appropriately, enables multicasting an encrypted simultaneous forwarding communication message to be performed efficiently.

Also, a related technology is disclosed in Patent document 4. The technology disclosed in Patent document 4 uses an encryption key. And the technology is a mechanism which, in a network communication which communicates using a plurality of communication apparatus, and being prepared for a case when a structure of a group in the communication apparatus changes according to a progress of time, updates a group key which is an encryption key, and distributes the key after update safely in the group.

PRECEDING TECHNICAL LITERATURE

Patent Document

Patent document 1: Japanese Patent Application Laid-Open No. 2007-034737 (pp. 5-6, FIG. 9)

Patent document 2: Japanese Patent Application Laid-Open No. 2007-234039 (p. 6)

Patent document 3: Japanese Patent Application Laid-Open No. 2008-124884

Patent document 4: Japanese Patent Application Laid-Open No.

Non-Patent Document

Non-patent document 1: RFC-2093: Group Key Management Protocol (GKMP) Specification.
Non-patent document 2: Wong, C. K., Gouda, M., and Lam, S. S., "Secure Group Communications Using Key Graphs", IEEE/ACM Trans. Networking, vol. 8, no. 1, pp. 16-30, 2000.

SUMMARY OF THE INVENTION

Problem to be Solved by the Invention

However, in the related method 1, when the number of clients in a network is N, the number of communications required for distribution will be O(N). That is, in the related method 1, there is a problem that the number of communications increases in proportion to the number of terminals.

Also, in the related method 2, there is a problem that a simultaneous forwarding destination of a new network key is: specified by an inclusion relation defined by the tree structure completely; and limited only to a group of clients belonging to a subtree which makes an internal vertex of a certain specific key tree a root.

In particular, in the case disconnection of a client is performed repeatedly, a key tree will become sparse and redundant. And the number of clients included in one subtree decreases gradually. And, in the worst case, there is a possibility that the number of communications may be an order of the number of clients. Because of this, in the related method 2, there is a case that operating for a long period of time will become a problem.

Accordingly, the present invention makes it one exemplary object to provide a network key update system, a server, a network key update method and a recording medium which, without depending on a key tree, suppresses degradation of performance due to update.

Means for Solving a Problem

The network key update system according to one aspect of the present invention includes a server and a client.

A server of the present invention which, when a client is disconnected from a network, updates a network key which is used in order to participate in said network, and the server includes
an address key allocation unit which generates an identifier for identifying a client by a combination of addresses in a plurality of address spaces and allocates an address key respectively to each address which said generated identifier includes; and
a network key encryption unit which generates a network key update key which is impossible to generate from the address key which said address key allocation unit allocated to each address which an identifier of a client which is a target to be disconnected includes, encrypts a new network key using said generated network key update key and distributes said encrypted new network key to the client via the network.

A network key update system of the present invention includes a server and a client, wherein when disconnecting the client from a network, updating a network key which is used in order to participate in said network and the network key update system includes
the server which further includes
an address key allocation unit which generates an identifier for identifying the client by a combination of addresses in a plurality of address spaces and allocates an address key respectively to each address which said generated identifier includes; and
a network key encryption unit which generates a network key update key which is impossible to generate from the address key which said address key allocation unit allocated to each address which an identifier of a client which is a target to be disconnected includes, encrypts a new network key using said generated network key update key and distributes said encrypted new network key to the client via the network;
and the client which further includes
a network key decryption unit which, using the address key which is allocated to the address of said client and stored in advance, generates a same network key update key as the network key update key which said network key encryption unit generated, and decrypts said new network key which is distributed from said server using the generated network key update key.

A network key update method of the present invention which, when a client is disconnected from a network, updates a network key which is used in order to participate in said network, and the network key update method includes
generating an identifier for identifying a client by a combination of addresses in a plurality of address spaces and allocating an address key respectively to each address which said generated identifier includes; and
generating a network key update key which is impossible to generate from the address key which is allocated to each address which an identifier of a client which is a target to be disconnected includes, encrypting a new network key using said generated network key update key, and distributing said encrypted new network key to the client via the network.

A non-transitory computer-readable recording medium of the present invention recording a program which, when a client is disconnected from a network, updates a network key which is used in order to participate in said network, and the recording medium recording a program which makes a computer execute processing includes
address key allocation processing which generates an identifier for identifying a client by a combination of addresses in a plurality of address spaces and allocates an address key respectively to each address which said generated identifier includes; and
network key encryption processing which generates a network key update key which is impossible to generate from the address key which is allocated to each address which an identifier of a client which is a target to be disconnected includes, encrypts a new network key using said generated network key update key and distributes said encrypted new network key to the client via the network.

A server of the present invention which, when a client is disconnected from a network, updates a network key which is used in order to participate in said network, and the server includes
address key allocation means for generating an identifier for identifying a client by a combination of addresses in a plurality of address spaces and allocating an address key respectively to each address which said generated identifier includes; and
a network key encryption unit which generates a network key update key which is impossible to generate from the address key which said address key allocation unit allocated to each address which an identifier of a client which is said target to be disconnected includes, encrypts a new network key using said generated network key update key and distributes said encrypted new network key to the client via the network.

The server according to one form of the present invention includes a network key encryption unit. The network key update method according to one aspect of the present invention distributes a new network key to a client. The recording medium according to one aspect of the present invention records a program to executes and network key encryption processing.

Effect of the Invention

One exemplary effect in each aspect of the present invention is, without depending on a key tree, to suppress degradation of performance by update.

EXEMPLARY EMBODIMENTS FOR CARRYING OUT OF THE INVENTION

The First Exemplary Embodiment

Figure 1:
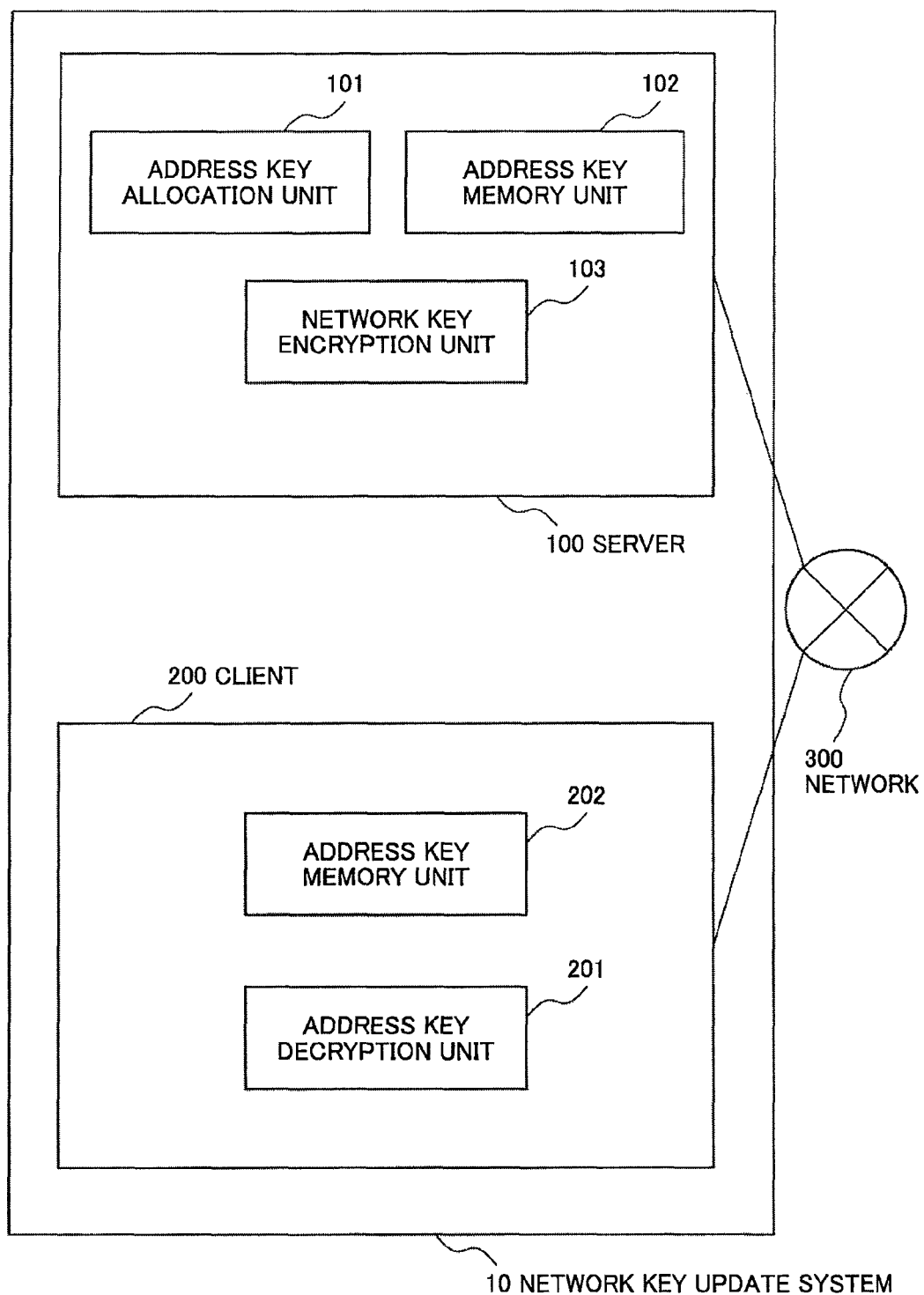
FIG. 1 is a block diagram showing an exemplary structure of a network key update system 10 according to the first exemplary embodiment.

In the following, the first exemplary embodiment of the present invention will be described with reference to drawings. The present exemplary embodiment relates to, in a network which judges appropriateness to participate in the network based on whether a network key is possessed or not, a network key update method in view of a scale of the network, and in particular, relates to a network key update system which, even when a large number of clients exist, can distribute a new network key by a small number of communications.

First, an outline of a network key update system according to the present exemplary embodiment invention will be described. According to the first exemplary embodiment of the network key update system according to the exemplary embodiment, a server includes an address key allocation unit, an address key memory unit and a network key encryption unit. Also, a client includes an address key memory unit and a network key decryption unit.

The address key allocation unit of the server makes a plurality of address spaces for an identifier of the client. And the address key allocation unit makes a correspondence of, under the condition that a client is uniquely identified by a combination of client's position (address) in each address space, unique secret information (address key) for the address of, in each address space, the identifier of the client.

And the address key allocation unit operates for each client so that all the address keys made to correspond to the addresses in each address space of the identifier of the client may be allocated using a transmission method which is possible by on-line or off-line and safe.

The address key memory unit of the server stores the address key allocated to the address in each address space of the identifier for all the clients without disclosing it to others and in secret.

Also, the network key encryption unit generates a network key update key (which is a key used when a network key is updated), using the address key which the address key memory unit stores, which is difficult to generate from an address key allocated to a client which is a target to be disconnected. Also, the network key encryption unit encrypts a new network key using the generated network key update key and forward it simultaneously in the network.

Further, simultaneous forwarding is to transmit a network key to all the clients included in a certain group. As simultaneous forwarding, for example, broadcasting or multicasting can be used. In the following, it is assumed that all the transmission processing for a group of clients is processed by simultaneous forwarding.

Specifically, cases are assumed in which: a group of clients sharing an address in a certain one address space is called an element group; and a group of clients which is specified by an intersection of an element group which extracted each one address from a plurality of different address spaces is called a structured group, respectively.

At this time, this network key encryption unit selects, among the structured groups not including a client n which is a target to be disconnected from the network, and under the condition that the clients for which a network key is already distributed are not counted, one structured group G with the largest number of elements. And the network key encryption unit generates a network key update key by a predetermined method from an address key which is made to correspond to the address shared by each client belonging to an element group whose intersection will be the structured group G. And the network key encryption unit encrypts a new network key using the generated network key update key.

Next, the network key encryption unit forwards simultaneously the encrypted network key to a client which is included in the structured group G together with information which specifies the structured group G.

The network key encryption unit repeats this operation until the new network key is distributed to all the clients other than the client n, that is, until a set of clients which does not include the client n which is the target to be disconnected and clients for which the new network key is already distributed becomes empty.

Here, information which specifies the structured group G includes, for example, information where part of the address which the identifier of the client includes is replaced by a specific symbol such as *. Further, the information which specifies the structured groups G is structured, for example, so that it indicates being a group of clients sharing an address other than the address indicated by a specific symbol such as *.

As a method to generate a network key update key, for example, there exists a following method. This method acquires an address which is shared by each client belonging to no smaller than one element groups whose intersection will be the structured group G. Next, this method calculates a hash value for a connected result of an address key which is made correspond to the address. In this case, for calculation of the hash value, for example, unidirectional hash algorithm widely used may be used.

The address key memory unit of the client stores, without disclosing it to others and in secret, the address key which the address key allocation unit of the server allocated.

Also, the network key decryption unit refers to information which specifies a distribution destination included in transmission data which the network key encryption unit transmitted. And in case one's own self is included in the distribution destination, the network key decryption unit generates a network key update key by the same method as the network key encryption unit using the address key which is stored in the address key memory unit and which is made to correspond to the address which specifies the distribution destination. And the network key decryption unit operates to decrypt the encrypted new network key received from the server using the generated network key update key, and replace the old network key by the decrypted result.

According to this exemplary embodiment, the server does not limit a simultaneous forwarding destination of a new network key only to a group of clients belonging to a subtree which makes an internal vertex of a certain specific key tree a root like the related method 2. Therefore, this exemplary embodiment enables division of clients into groups which, in a form with higher flexibility, can suppress the number of division small. As stated above, this exemplary embodiment can achieve the object which is not to depend on a key tree.

FIG. 1 is a block diagram showing an exemplary structure of a network key update system 10 according to the present exemplary embodiment. As shown in FIG. 1, the network key update system 10 includes a server 100 and a client 200. Also, the server 100 and the client 200 are connected mutually via a network 300. Further, in FIG. 1, although only one client 200 is indicated, it is supposed that the network key update systems 10 include a plurality of (N units of) clients 200.

Also, as shown in FIG. 1, the server 100 includes an address key allocation unit 101, an address key memory unit 102 and a network key encryption unit 103. The server 100 is realized, specifically, by an information processing apparatus such as a personal computer which operates following a program.

Also, as shown in FIG. 1, the client 200 includes a network key decryption unit 201 and an address key memory unit 202. The client 200 is realized, specifically, by a sensor unit which installs various sensors such as a heart rate meter, a thermometer, an electricity meter and a gas meter, and which is equipped with at least a control unit and a communication unit for performing transmission processing of a detection signal of various sensors. Further, because each client 200 of N units is all with the same structure, only a structure of one unit of client 200 is shown in FIG. 1.

Each unit shown in FIG. 1 operates as follows respectively.

The address key allocation unit 101 of the server 100 is realized, for example, by CPU (Central Processing Unit) of an information processing apparatus which operates following a program. In order to generate an identifier for identifying the client 200, the address key allocation unit 101 includes a function to create a plurality of address spaces. Also, the address key allocation unit 101 includes a function to distinguish the client 200 uniquely by a combination of positions (specifically, addresses) of the client 200 in each address space. Also, the address key allocation unit 101 includes a function to allocate secret information (specifically, address key) to the position (address) of the client 200 in each address space respectively based on the identification result of the client 200.

Figure 2:
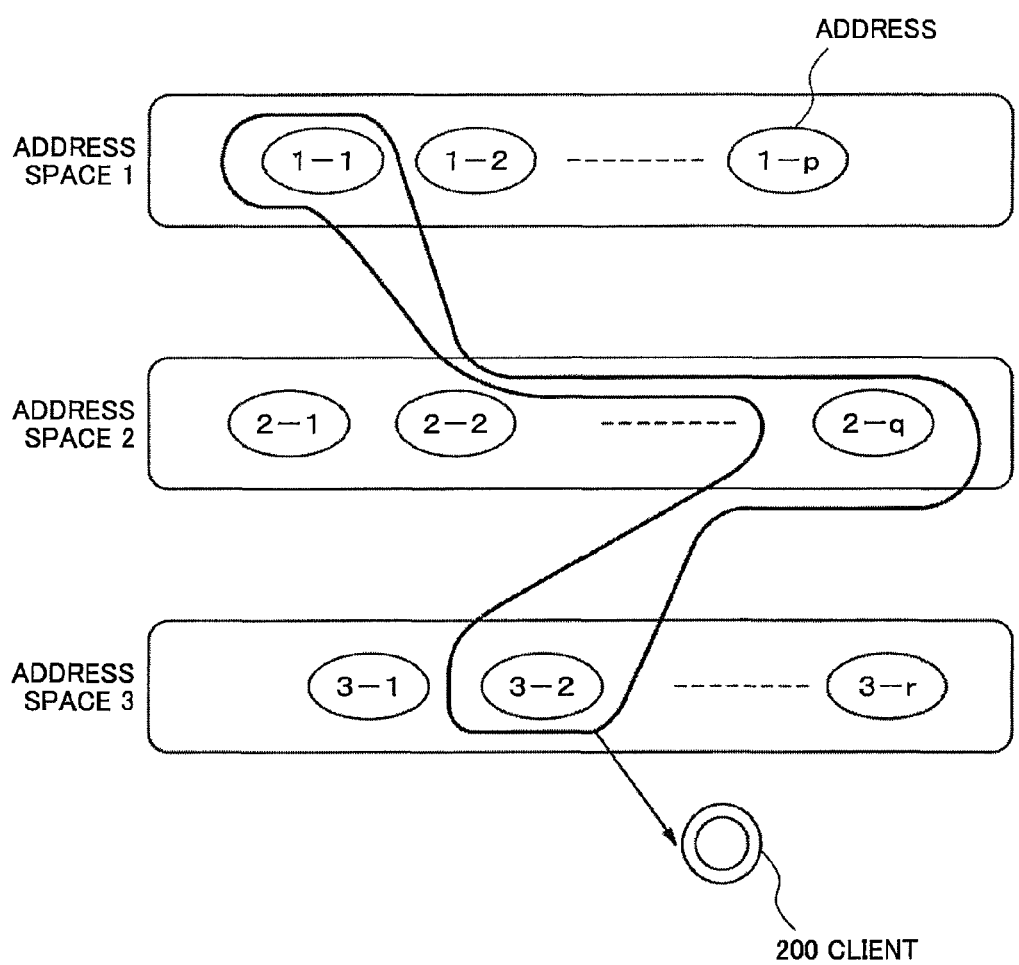
FIG. 2 is an explanatory drawing which indicates a situation in which a client is identified by three address spaces.

FIG. 2 is an explanatory drawing which indicates a situation in which the client 200 is identified by three address spaces. In the following, a description will be made based on an example shown in FIG. 2. Further, FIG. 2 describes, in order to make an explanation easy to understand, a case where three address spaces are used, and the address space which the address key allocation unit 101 creates is not limited to three. For example, an address space of no smaller than four may be generated.

In the example shown in FIG. 2, an address of each address space is indicated in each oval shown in FIG. 2. For example, as shown in FIG. 2, an address space 1 includes addresses 1-1, 1-2, . . . , 1-p, an address space 2 includes addresses 2-1, 2-2, . . . , 2-q, and an address space 3 includes addresses 3-1, 3-2, . . . , 3-r. Further, in FIG. 2, p, q and r show a maximum number of the addresses in each address space necessary to identify all the clients 200.

Figure 3:
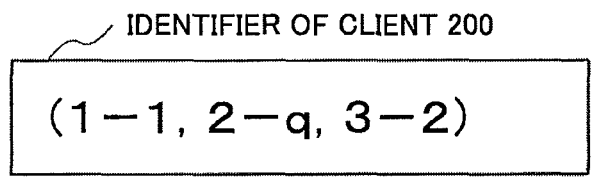
FIG. 3 is an explanatory drawing showing an exemplary identifier of a client.

In the example shown in FIG. 2, a combination of the addresses of each address space will be an identifier for identifying the client 200. For example, in case of the client 200 shown in FIG. 2, as shown in FIG. 3, (1-1, 2-q, 3-2) will be the identifier of the client 200. Thus, under the condition that the client 200 is identified uniquely by the position (address) of the client 200 in each address space, the address key allocation unit 101 makes correspond unique secret information (specifically, address key) to the address of each address space of the identifier of the client 200.

Figure 4:
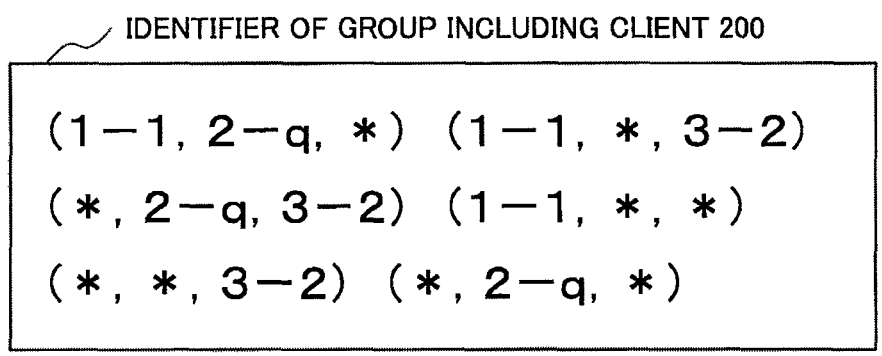
FIG. 4 is an explanatory drawing showing an exemplary identifier of a group.

Also, according to this exemplary embodiment, a combination of the addresses of each address space is also used as an identifier for identifying a group of clients. For example, as a group including the client 200 shown in FIG. 2, as shown in FIG. 4, it is assumed that there are six groups which are (1-1, 2-q, *), (1-1, *, 3-2), (*, 2-q, 3-2), (1-1, *, *), (*, *, 3-2) and (*, 2-q, *). Here, supposing that an address is arbitrary for the address described as *, each group represents a group of clients with the address other than the address indicated by *. Further, * may not necessarily be *, and may be replaced by other symbol which mean that the address is arbitrary.

In particular, according to this exemplary embodiment, like (1-1, *, *), (*, *, 3-2) and (*, 2-q, *), a group of clients sharing only one address is called an element group (including a group with only one client). Also, like (1-1, 2-q, *), (1-1, *, 3-2), (*, 2-q, 3-2) and (1-1, 2-q, 3-2), a group of clients sharing no smaller than two addresses (including a group with only one client) is called a structured group.

Figure 5:
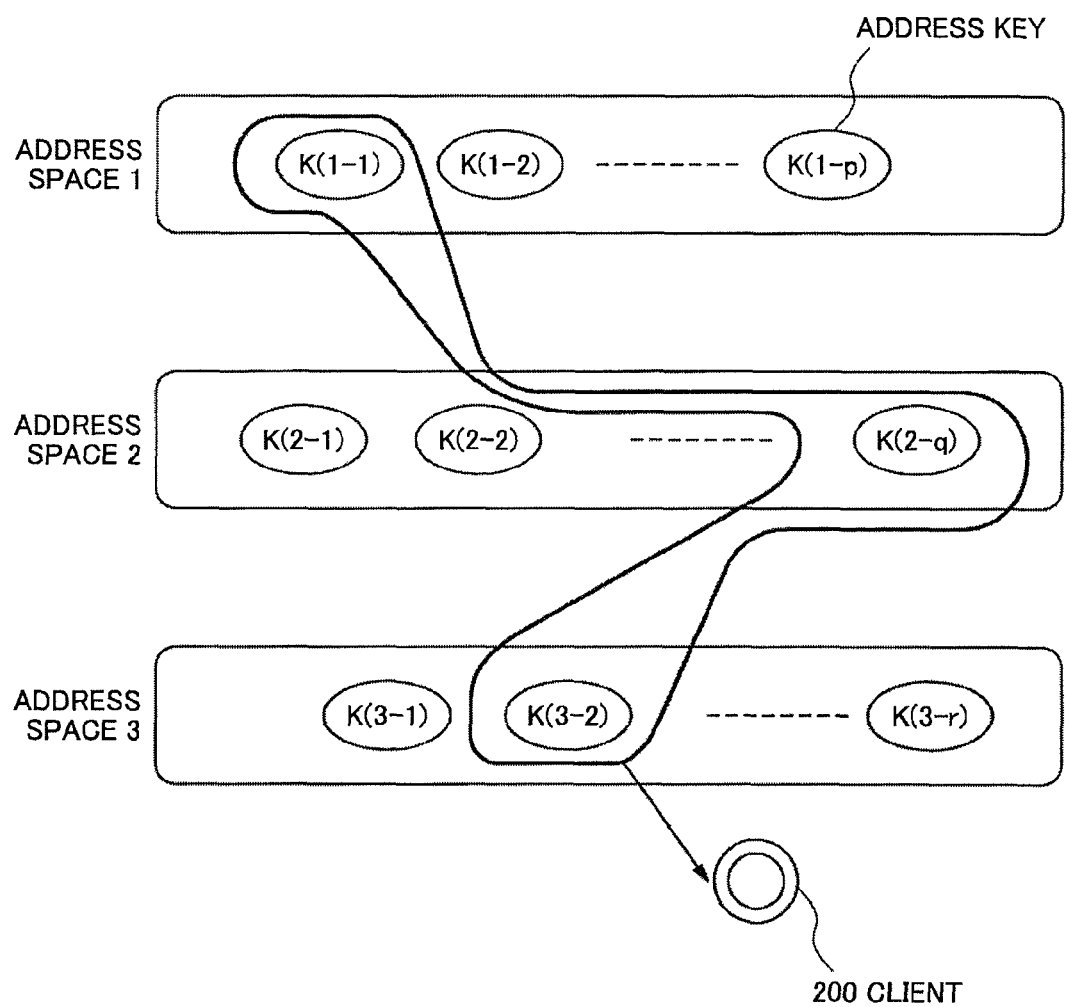
FIG. 5 is an explanatory drawing showing an exemplary address key.

In an example shown in FIG. 5, the address key allocation unit 101 makes an address key $K(X)$ correspond to an address X. Specifically, the address key allocation unit 101 makes a correspondence of address keys $K(1-1), K(1-2), \ldots, K(1-p)$ for addresses 1-1, 1-2, ..., 1-p in the address space 1 respectively. Also, the address key allocation unit 101 makes a correspondence of address keys K(2-1), K(2-2), ..., K(2-q) for addresses 2-, 2-2, ..., 2-q in the address space 2 respectively. Also, the address key allocation unit 101 makes a correspondence of address keys K(3-1), K(3-2), ..., K(3-r) for addresses 3-1, 3-2, ..., . 3-r in the address space 3 respectively.

Figure 6:
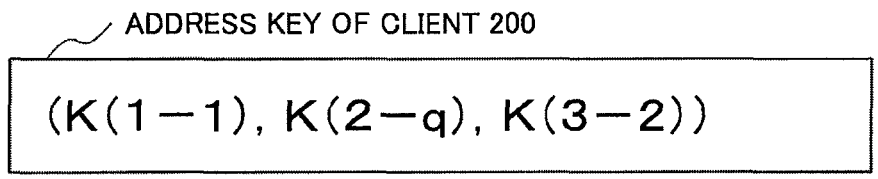
FIG. 6 is an explanatory drawing showing an exemplary address key stored in a client.

And the address key allocation unit 101 allocates for each client 200 all the address keys which are made to correspond to the addresses in each address space of which the identifier of the client 200 includes using a transmission method which is possible by on-line or off-line and safe. In this case, as shown in FIG. 6, the address key allocation unit 101 allocates to the client 200 a bundle of address keys including total of three types of address keys of (K(1-1), K(2-q), K(3-2)).

Figure 7:
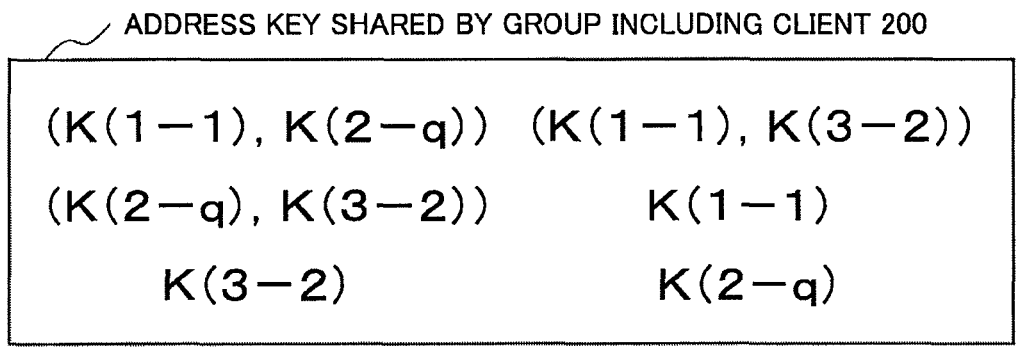
FIG. 7 is an explanatory drawing showing an exemplary address key shared by a group.

Also, each client belonging to a group including the client 200, (1-1, 2-q, *), (1-1, *, 3-2), (*, 2-q, 3-2), (1-1, *, *), (*, *, 3-2) and (*, 2-q, *), as shown in FIG. 7, shares an address key of two types or one type of (K(1-1), K(2-q)), (K(1-1), K(3-2)), (K(2-q), K(3-2)), K(1-1), K(3-2) and K(2-q) respectively in that order. Further, according to this exemplary embodiment, each client belonging to an element group shares one type of address key. Also, each client belonging to a structured group shares two types of address keys.

The address key memory unit 102 of the server 100 is realized, specifically, by a memory unit such as a magnetic disk unit or an optical disk unit. The address key memory unit 102 stores the address key which is allocated to the address in each address space which the identifier of all the clients 200 includes without disclosing it to others and in secret. Further, the address key memory unit 102 makes a correspondence of, for example, each address key for an address in the address space respectively and stores it.

Further, in this exemplary embodiment, the address key memory unit 102 makes the address key not to be used unlawfully by using publicly known technology such as managing an address key stored inside safely using a tamper resistant device, or restricting access to information by authentication means such as a password which only a proper server administrator knows.

The network key encryption unit 103 of the server 100 is realized, specifically, by CPU of an information processing apparatus and a network interface unit which operate following a program.

The network key encryption unit 103 includes a function to generate a network key update key which a client which is a target to be disconnected from the network cannot generate using an address key which the address key memory unit 102 stores. That is, the network key encryption unit 103 generates the network key update key using the address key which the client which is the target to be disconnected does not share.

Also, the network key encryption unit 103 includes a function, for a group which can generate this network key update key, to encrypt a new network key and to transmit it together with an identifier which indicates a group of distribution destination.

Specifically, case are assumed in which: a group of clients sharing an address in a certain one address space is called an element group; and a group of clients which is specified by an intersection of an element group which extracted each one address from a plurality of different address spaces is called a structured group, respectively.

At this time, the network key encryption unit 103 selects, among the structured groups not including the client n which is the target to be disconnected from the network, and under the condition that the clients for which a network key is already distributed are not counted, one structured group G with the largest number of elements. And the network key encryption unit 103 generates a network key update key by a predetermined method from an address key which is made to correspond to the address shared by each client belonging to an element group whose intersection will be the structured group G.

And the network key encryption unit 103 encrypts a new network key using the generated network key update key. And the network key encryption unit 103 forwards simultaneously the encrypted network key to a client which is included in the structured group G together with the identifier which specifies the structured group G.

The network key encryption unit 103 repeats this operation until the new network key is distributed to all the clients other than the client n, that is, until a set of clients which does not include the client n which is the target to be disconnected and clients for which the new network key is already distributed becomes empty. Further, simultaneous forwarding is to transmit a network key to all the clients included in a certain group.

As a method to generate a network key update key, the network key encryption unit 103 includes, for example, the following method. This method acquires an address which is shared by each client belonging to no smaller than one element groups whose intersection will be the structured group G. Next, this method calculates a hash value for a connected result of an address key which is made to correspond to the address. In this case, the network key encryption unit 103 may use unidirectional hash algorithm widely used for calculation of a hash value.

The address key memory unit 202 of the client 200 is realized, specifically, by a memory unit such as a memory provided in a sensor unit or a magnetic disk unit. The address key memory unit 202 stores the address key which the address key allocation unit 101 of the server 100 allocated without disclosing it to others and in secret.

Further, in this exemplary embodiment, the address key memory unit 202 makes the address key not to be used unlawfully using publicly known technology such as managing an address key stored inside safely using a tamper resistant device, or restricting access to information by authentication means such as a password which only a proper client administrator knows.

Also, in an exemplary address key allocation shown in FIG. [4] 2, a bundle of keys which the client 200 stores in secret includes, as shown in FIG. 5, total of three types of address keys of (K(1-1), K(2-q), K(3-2)).

The network key decryption unit 201 of the client 200 is realized, specifically, by a control unit and a communication unit which the sensor unit includes.

The network key decryption unit 201 operates so that an encrypted new network key transmitted from the server 100 via the network 300 may be received.

Also, the network key decryption unit 201 refers to an identifier of a group of transmission destination included in the received data, and determines whether one's own self is included in the identifier. And, in case one's own self is included in the identifier, the network key decryption unit 201 operates so that the encrypted new network key may be decrypted by using the address key which the address key memory unit 202 stores and which is made to correspond to the address which specifies the group of transmission destination.

And the network key decryption unit 201 operates to discard the old network key, to replace it by a decryption result (new network key), and to store the new network key in the address key memory unit 202.

Further, in this exemplary embodiment, the server 100 and the client 200 store various programs for realizing the operation mentioned above.

Figure 16:
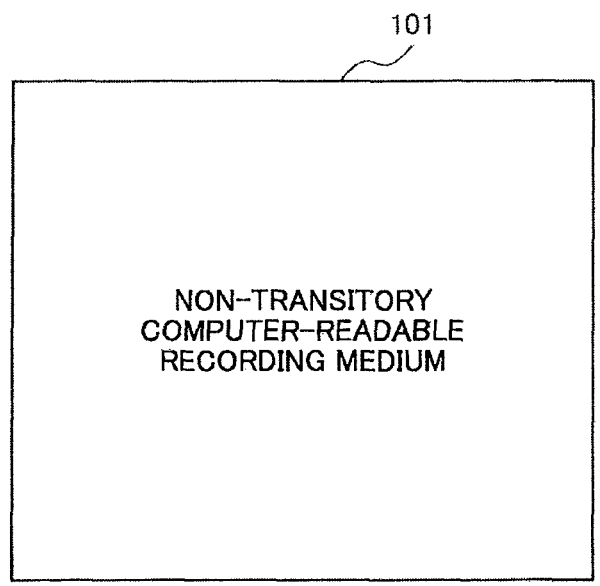
FIG. 16 is an explanatory drawing showing a non-transitory computer-readable recording medium.

Further, a non-transitory computer readable recording medium recording thereon the programs may be supplied to the server 100 and the client 200. FIG. 16 is an explanatory drawing showing the non-transitory computer-readable recording medium 400.

Figure 8:
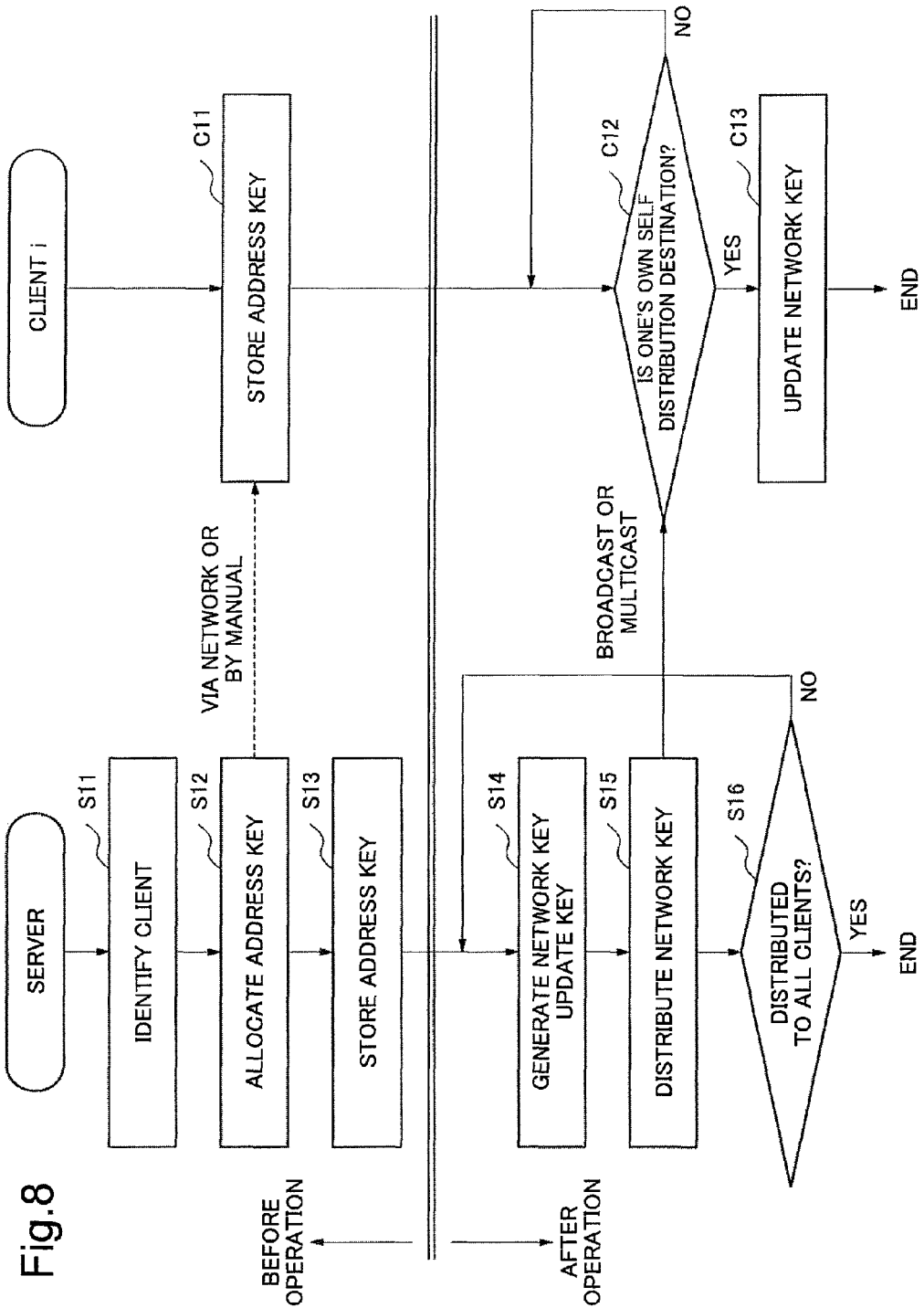
FIG. 8 is a flow chart of the first exemplary embodiment.

Next, operation of the system will be described using a flow chart. FIG. 8 is a flow chart showing an example of update processing of a network key when disconnecting a certain client from a network. First, setup operation of the system before starting the operation of the system will be described.

First, before starting the operation of the system, the server 100 (address key allocation unit 101) identifies N units of clients 200 uniquely by a combination of addresses of a plurality of address spaces (Step S11 shown in FIG. 8).

Next, the server 100 (address key allocation unit 101) makes a correspondence of a unique address key for the address which is in each address space and which an identifier of the client 200 includes. And the server 100 (address key allocation unit 101) allocates, for a client group (element group) of which an address coincides in each address space of the identifier, the same address key to the client 200 using a safe method (Step S12). In this case, as a method to allocate the address key to the client 200, a method to transmit the address key on-line via an existing safe communication path using, for example, such as SSL (Secure Sockets Layer) or IPsec (Internet Protocol security) may be used. Also, for example, a proper administrator may perform it by using publicly known means such as operating an input unit such as a keyboard, and inputting to the client 200 the address key obtained by a proper off-line route.

Next, a client i ($1<=i<=N$) which is allocated an address key by the server 100 stores the allocated address key in the address key memory unit 202 (Step C11). Also, the server 100 stores all the address keys allocated to each client 200 in the address key memory unit 102 (Step S13).

By executing processing of the steps mentioned above, it becomes possible for the server 100 to perform update processing of a network key when disconnecting a certain client from the network. That is, the server 100 will be in a state to be able to start the operation of the system.

After starting the operation of the system, suppose a situation such as, for example, a certain client n is stolen or is exposed to an attack occurred in which the client n needs to be disconnected from the network. In this case, the server 100 (network key encryption unit 103) generates a network key newly, and generates a network key update key which the client n which is the target to be disconnected from the network cannot generate. And, for a group which can generate this network key update key (generated network key update key), the server 100 (network key encryption unit 103) encrypts the new network key and forwards it simultaneously together with an identifier which indicates a group of distribution destination. That is, the server 100 (network key encryption unit 103) forwards simultaneously to a client belonging to the group sharing the address key used for a generation of the network key update key.

Specifically, case are assumed in which: a group of clients sharing an address in a certain one address space is called an element group; and a group of clients which is specified by an intersection of an element group which extracted each one address from a plurality of different address spaces is called a structured group, respectively. At this time, the server 100 (network key encryption unit 103) selects, among the structured groups not including the client n which is the target to be disconnected from the network, and under the condition that the clients for which a network key is already distributed are not counted, one structured group G with the largest number of elements.

And the server 100 (network key encryption unit 103) calculates a hash value for a connected result of an address key which is made correspond to the address shared by each client belonging to an element group whose intersection becomes the structured group G, and generates it as the network key update key (Step S14).

After that, the server 100 (network key encryption unit 103) encrypts a new network key using the generated network key update key. And the server 100 (network key encryption unit 103) forwards simultaneously the encrypted network key to a client included in G together with an identifier which specifies the structured group G (Step S15). In this case, the server 100 (network key encryption unit 103) can use as a method for simultaneous forwarding, for example, a method by multicasting or broadcasting. Further, it is supposed that the new network key which the network key encryption unit 103 encrypts is generated by the server 100 separately.

The server 100 (network key encryption unit 103) executes processing of Steps S14 and S15 repeatedly until the new network key is distributed to all the clients other than the client n (Step S16). That is, the server 100 (network key encryption unit 103) executes processing of Steps S14 and S15 repeatedly until the structured group which does not include the client n which is the target to be disconnected and clients for which the new network key is already distributed will be an empty set (Step S16).

Next, a client i (network key decryption unit 201) receives the encrypted new network key transmitted from the server 100 via the network 300. And the client i (network key decryption unit 201) refers to the identifier of the transmission destination group received simultaneously, and determines whether one's own self is included (Step C12). In case one's own self is included in the identifier of the transmission destination group, the client i (network key decryption unit 201) decrypts the encrypted new network key using the address key which is made to correspond to the address which specifies the group of transmission destination. And the client i (network key decryption unit 201) replaces the old network key by the new network key which is the decryption result (Step C13).

As described above, according to this exemplary embodiment, the server 100 does not distribute the network key to the client individually, but repeats simultaneous forwarding of the network key for the structured group which doe not include the client n which is the target to be disconnected. As a result, this exemplary embodiment can reduce the number of communications required for the distribution of the network key to at least equal or less compared with the related method 2.

The Second Exemplary Embodiment

In the network key encryption unit according to the first exemplary embodiment, when a distribution destination group is divided into structured groups which do not include the client n which is the target to be disconnected from the network, depending on a way of selecting the structured group G, there are cases when the number of divided structured group can be made a number of division less than that of the related method 2, or can be a number of division with the same number. Therefore, when compared with the related method 2, although the first exemplary embodiment can suppress the number of communications to at least equal or less, it may not be able to reduce the number of communications less than the related method 2 necessarily.

The second exemplary embodiment is characterized by changing an operation of the network key encryption unit so that the possibility that the number of division of the distribution destination groups becomes less than the first exemplary embodiment may become higher. In the following, the second exemplary embodiment will be described. The second exemplary embodiment of the present invention is different from the first exemplary embodiment at a point of operation of the network key encryption unit. Because other structures are the same, only the network key encryption unit which is different will be described.

A case is supposed when a group of clients which is specified by an intersection of element groups which are formed by extracting one each out of i sets (i is the number of 1 or more) of different address spaces is called, in particular, a structured group of order i. The network key encryption unit of the server according to the second exemplary embodiment of the present invention selects, among the structured groups which include the client n which is the target to be disconnected from the network, and of which the order the number of whole address spaces, the structured group G' with a smallest number of elements.

Next, the network key encryption unit selects, among the structured groups which do not include the clients included in the selected structured group G', and under the condition that the clients for which a network key is already distributed are not counted, one structured group G with the largest number of elements.

Next, the network key encryption unit generates a network key update key by a predetermined method from an address key which is made to correspond to the address shared by each client belonging to an element group whose intersection will be the structured group G.

Next, the network key encryption unit encrypts a new network key using the generated network key update key. And the network key encryption unit forwards simultaneously the encrypted network key to a client which is included in the structured group G together with the information which specifies the structured group G.

The network key encryption unit repeats this operation until the new network key is distributed to all the clients other than the clients included in the structured group G'. That is, the network key encryption unit repeats until the structured group which does not include the clients for which the new network key is already distributed will be the structured group G'.

Finally, the network key encryption unit select, among the structured groups which the order included in the structured group G' equals the number of the whole address spaces, one structured group G" which do not include the client n which is the target to be disconnected from the network. Next, the network key encryption unit generates a network key update key by a predetermined method from an address key which is made to correspond to the address shared by each client belonging to an element group whose intersection will be the structured group G".

Next, the network key encryption unit encrypts a new network key by the generated network key update key. And the network key encryption unit distributes the encrypted network key to only one client which is included in the structured group G" together with the information which specifies the structured group G".

The network key encryption unit repeats this operation until the new network key is distributed to the client other than the client n included in structured group G". That is, the network key encryption unit operates to repeat until a group of clients which does not include the client n which is the target to be disconnected and the clients for which the new network key is already distributed will be an empty set.

As described above, according to this exemplary embodiment, the network key update system 10 divides a group of distribution destination so that the number of groups which include one client only may become as small as possible. As a result, this exemplary embodiment can make the possibility that the number of division of the distribution destination group is reduced less than that of the related method 2 higher.

Embodiment

Next, effects of the network key update system will be described using a specific embodiment. As an exemplary embodiment, an operation when collecting environmental information from a sensor network installed in a certain commercial building will be described.

This commercial building consists of four buildings (building A, building B, building C, building D) and each building is assumed to be three storied (first floor, second floor, third floor). At this time, a client including a sensor function is installed on each floor one at most. And a server realized by an information processing apparatus such as a personal computer is installed on the side of an inspector such as a business operator 10.

The client senses the environmental information around the installed position by the sensor function. The result is supposed to be utilized in the same sensor network including the server.

At this time, the server can specify each client uniquely by a combination of each address of two address spaces (building name, floor number of installation). It is supposed that all the clients perform participation processing to the network using key information shared by the network (network key) which is represented by a WEP (Wired Equivalent Privacy) encryption key in a general wireless LAN (Local Area Network).

At this time, it is supposed that an attacker attacks a certain client, and obtained the network key included in this client unlawfully. In this case, the attacker can participate in this network unlawfully. There is a possibility, for example, that the attacker may refer to the information such as shopper's traffic line information in the commercial building useful for marketing and so on unlawfully. Accordingly, the network key of the client which is fallen into the hands of a third party has to be disabled from a view point of security.

Figures 9, 10:
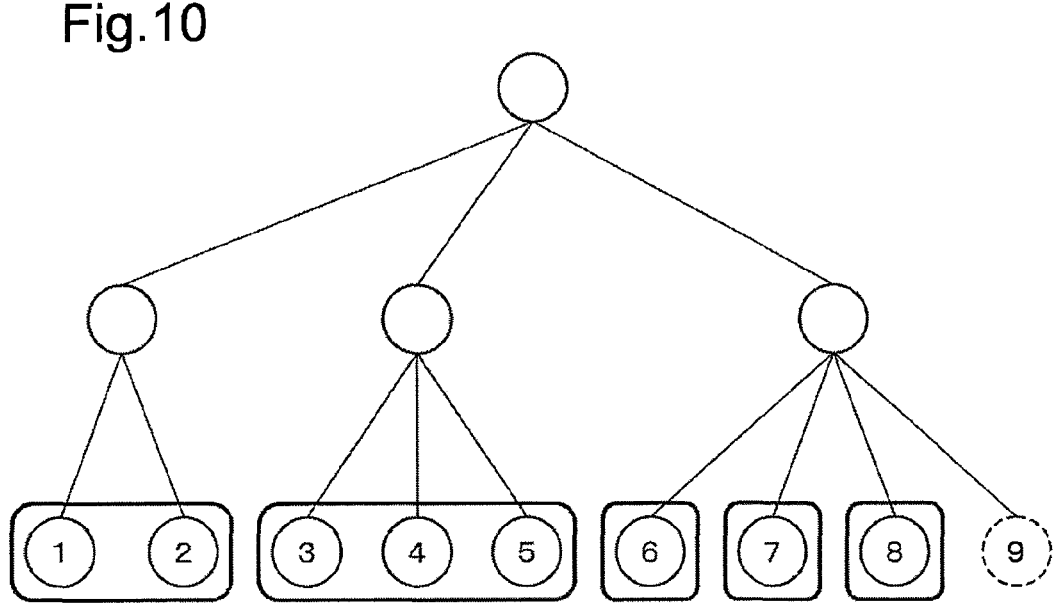
FIG. 9 is an explanatory drawing showing a specific exemplary application environment of a network key update system according to the embodiments.
FIG. 10 is an explanatory drawing showing an exemplary application of a related method according to the embodiments.

FIG. 9 is a schematic diagram of an application environment of the network key update system. In this embodiment, there exist nine units of clients. And the network key update system specifies a position of each client using address spaces corresponding to a building and a floor number. In the schematic diagram, a client is expressed by a round mark and the clients installed on the same floor are indicated in the same row and the client installed in the same building are indicated in the same column. When calling the nine units of clients in the figure by the number of (1)-(9) for the description purposes, (9) means the client which exists on the first floor of building D.

Now, it is supposed that (9) is disconnected from the network. An exemplary key tree of the related method 2 is shown in FIG. 10. FIG. 10 describes clearly simultaneous forwarding destination for distribution of a new network key when a network key is updated so that (9) may be disconnected. That is, when the network key update system disconnects (9), it selects a vertex among vertices other than those become the ancestor of (9) and from vertices near the root of the key tree in a top-down way. And the network key update system decides, by dividing the key tree into subtrees which include each selected vertex as a root, the division of a client group which becomes a simultaneous forwarding destination of the new network key. At this time, {(1), (2)}, {(3), (4), (5)}, {(6)}, {(7)}, {(8)} will be a division of the group for the simultaneous forwarding destination. That is, in the distribution of the network key, the five of communications are needed.

Figure 11:
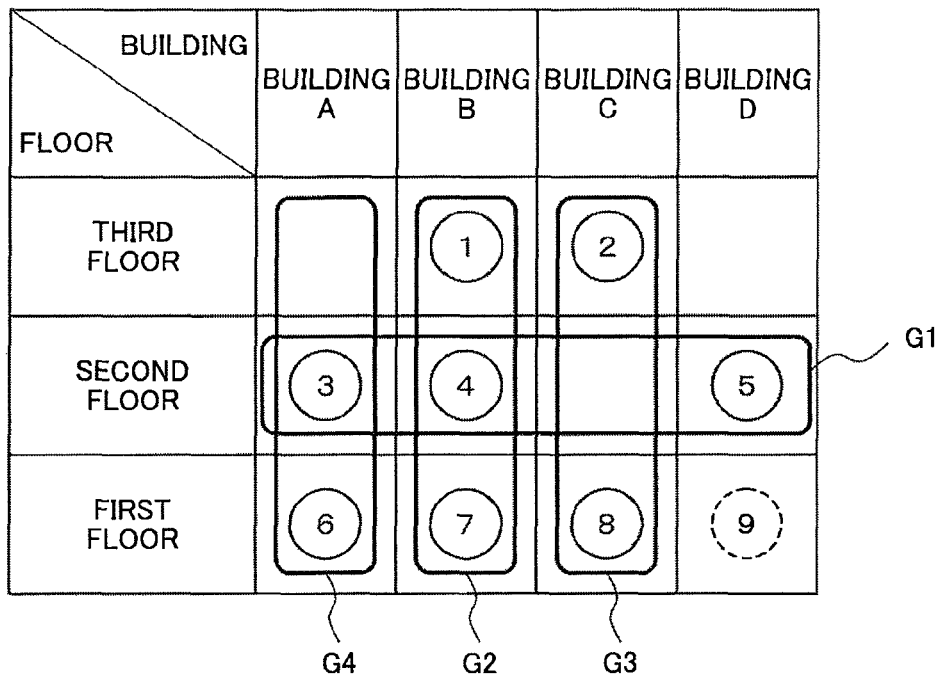
FIG. 11 is an explanatory drawing showing an exemplary desirable application of the first exemplary embodiment according to the embodiments.

On the other hand, it is supposed to disconnect (9) from the network by applying the first exemplary embodiment. An exemplary distribution destination of a new network key at this time is indicated as shown in FIG. 11. Among the structured groups which do not include (9) which is disconnected from the network, one of the structured groups G with the largest number of elements is a group of {(3), (4), (5)} indicated by G1 in FIG. 11 Accordingly, the server forwards simultaneously the new network key to G1. After that, among the structured groups which do not include (9), and under the condition that the clients for which the network key is already distributed are not counted, one of the structured groups G with the largest number of elements will be, for example, a group {(1), (4), (7)} indicated by G2 in FIG. 11. After that, the server decides in the same way a group of {(2), (8)} indicated by G3 and a group of {(3), (6)} indicated by G4 successively as a group of distribution destination. That is, the number of division of the group of distribution destination for the network key will be four, and the distribution of the network key will do by four of the number of communications.

Figure 12:
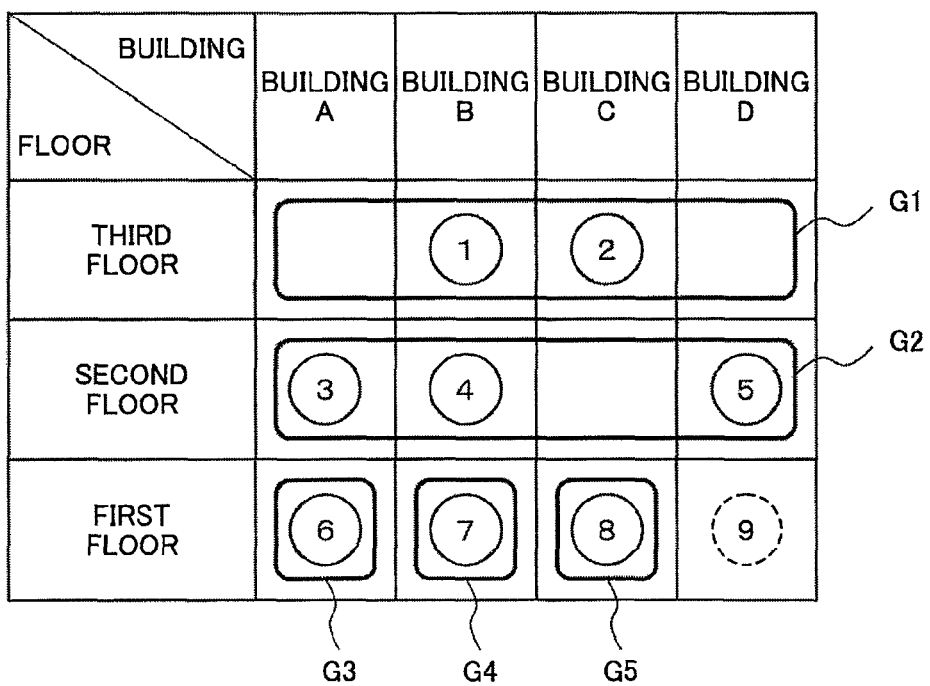
FIG. 12 is an explanatory drawing showing an exemplary undesirable application of the first exemplary embodiment according to the embodiments.

However, depending on a selection of G, division as shown in FIG. 12 can also be considered. At this time, a group of {(1), (2)} indicated by G1, a group of {(3), (4), (5)} indicated by G2, a group of {(6)} indicated by G3, a group of {(7)} indicated by G4 and a group of {(8)} indicated by G5 will be the division of the group for simultaneous forwarding destination. Therefore, in the distribution of the network key, five of the number of communications are needed same as the related method 2.

Figure 13:
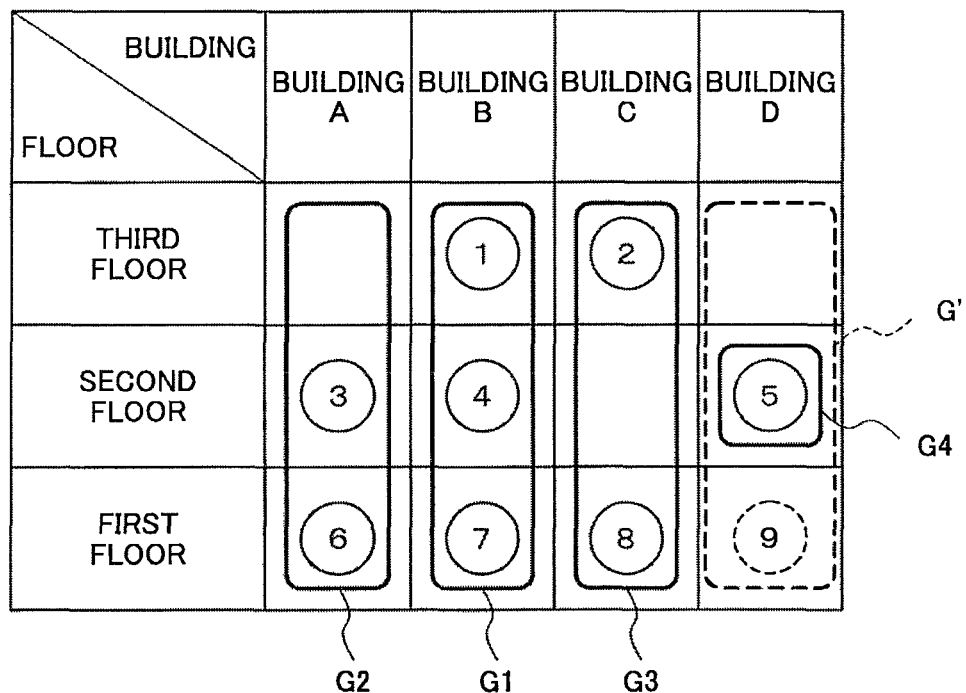
FIG. 13 is an explanatory drawing showing an exemplary application of the second exemplary embodiment according to the embodiments.
Figure 14:
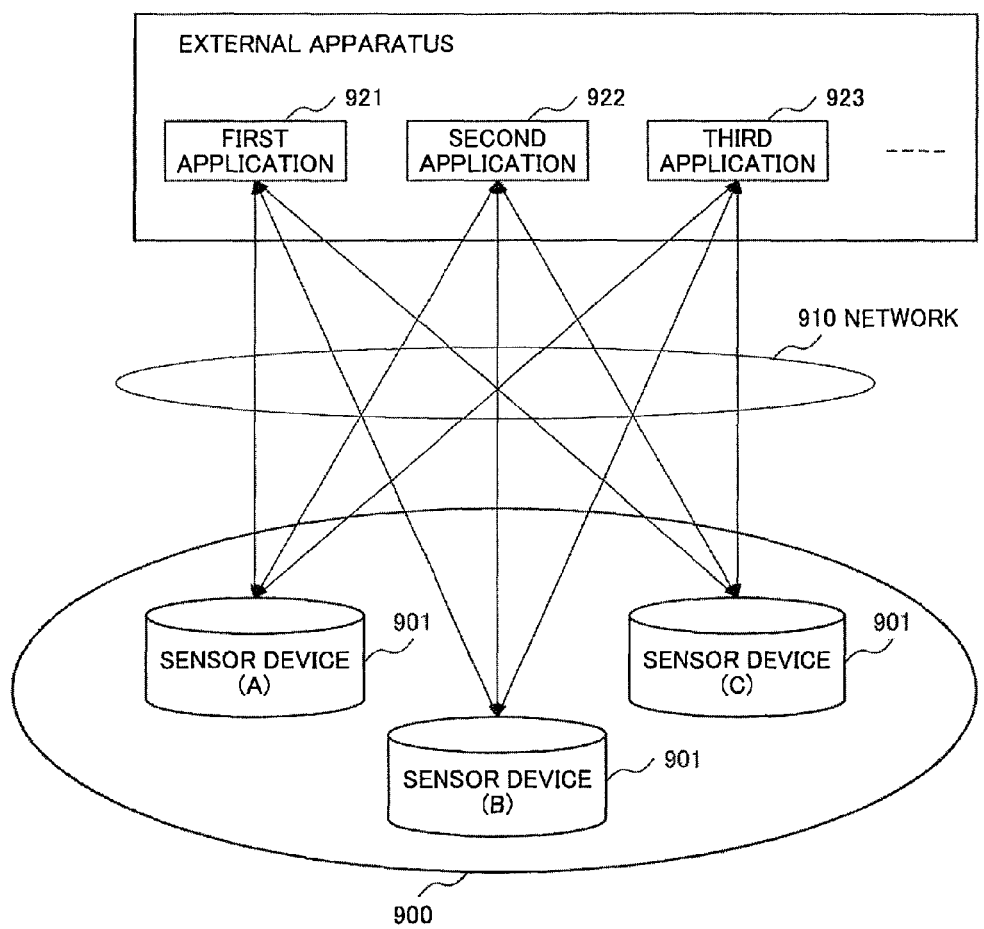
FIG. 14 is an explanatory drawing showing an exemplary sensor network.

Next, an example in case the second exemplary embodiment is applied is indicated by referring to FIG. 13. First, among the structured groups which include (9) to be disconnected from the network and which is with the order is a value which subtracted 1 from the number of whole address spaces, a structured group with the smallest number of elements will be group G' shown in FIG. 13. After G' is decided, among the structured groups which do not include clients included in G', a group with the largest number of elements is G1 {(1), (4), (7)}. Therefore, the server forwards simultaneously the new network key to G1. After that, among the structured groups which do not include nodes included in G', and under the condition that clients for which the network key is already distributed are not counted, one of the structured groups G with the largest number of elements will be G2 {(3), (6)}. Therefore, the server decides G2 {(3), (6)} as a group of distribution destination. After that, the server decides in the same way G3 {(2), (8)} as a group of distribution destination. At this time, as the structured group which does not include the clients for which the new network key is distributed becomes only G', the server decides, among the structured groups which the order included in G' equals the number of the whole address spaces, a structured group of G4 {(5)} which does not include the client n to be disconnected from the network. As described above, the server decides G1 {(1), (4), (7)}, G2 {(3), (6)}, G3 {(2), (8)} and G4 {(5)} as the groups of distribution destination. In other words, the distribution of the network key will do by four of the number of communications.

As described above, in case the second exemplary embodiment is applied, because there exists no choice of group division other than this, the number of communications will always be four, and it becomes possible to make the number of communications less than the related method 2.

As described above, according to each exemplary embodiment of the present invention, the server does not distribute the network key to the client individually, but repeats simultaneous forwarding of the network key to the structured group which does not include the client which is the target to be disconnected. As a result, each exemplary embodiment of the present invention can reduce the number of communications required for distribution of the network key. Further, because each exemplary embodiment of the present invention does not depend on a tree structure like the related method 2, it is possible to suppress the division of a group which becomes a simultaneous forwarding destination of the network key to the number equal to or less than the related method 2. That is, each exemplary embodiment of the present invention can reduce the distribution number of times of the network key less than the related method.

Figure 15:
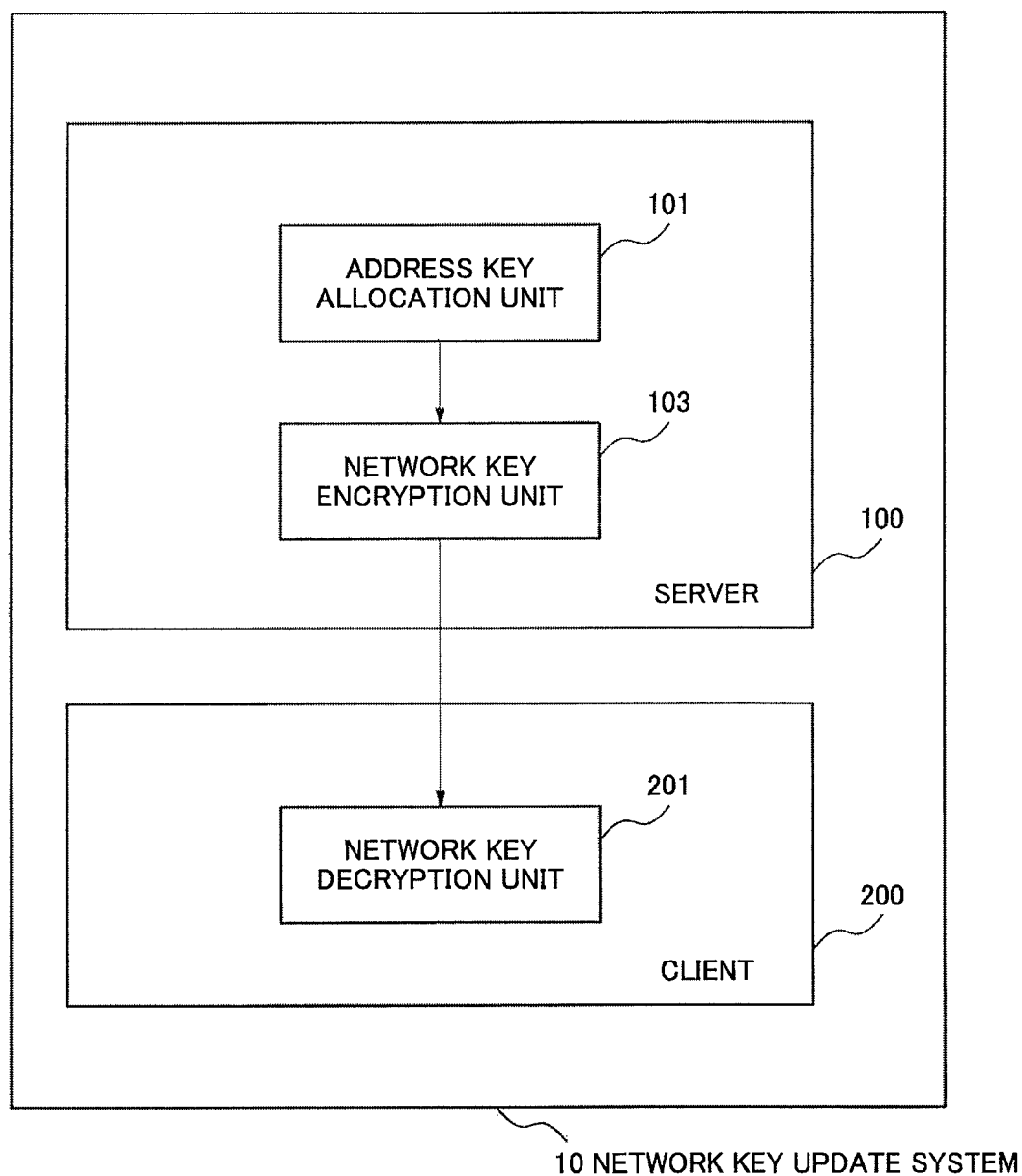
FIG. 15 is a block diagram showing a smallest exemplary structure of a network key update system.

Next, a minimum structure of the network key update system according to the exemplary embodiment of the present invention will be described. FIG. 15 is a block diagram showing a minimum exemplary structure of a network key update system 10. As shown in FIG. 15, the network key update system 10 includes, as a minimum component, a server 100 and a client 200. Also, the server 100 includes an address key allocation unit 101 and a network key encryption unit 103. Also, the client 200 includes a network key decryption unit 201.

In the network key update system 10 of the minimum structure shown in FIG. 15, the address key allocation unit 101 generates an identifier for identifying the client 200 by a combination of an address in a plurality of address spaces, and allocates an address key to each address respectively of which the generated identifier includes.

And the network key encryption unit 103 generates a network key update key which is impossible to generate from the address key which the address key allocation unit 101 allocated to a client 200 which is a target to be disconnected, encrypts a new network key using the generated network key update key, and distributes it to the clients 200 via the network.

And the network key decryption unit 201 generates, using the address key which is allocated to the address of the client 200 and stored in advance, a network key update key same as the network key update key which the network key encryption unit 103 generated, and decrypts the new network key which is distributed from the server 100 using the generated network key update key.

Accordingly, according to the network key update system 10 of the minimum structure, it is possible to reduce the number of communications at the time of update of a network key and without depending on a key tree, degradation of the performance by the update can be suppressed. Further, according to this exemplary embodiment, characteristic structures of the network key update system as shown in (1)-(5) below are indicated.

(1) A network key update system is characterized by: being the network key update system which, when a client (for example, realized by a client 200) is disconnected from a network, updates a network key used to participate in the network; and a server (for example, realized by a server 100) comprising: an address key allocation unit (for example, realized by an address key allocation unit 101) which generates an identifier for identifying a client by a combination of an address in a plurality of address spaces, and allocates an address key respectively to each address which the generated identifier includes; and a network key encryption unit (for example, realized by a network key encryption unit 103) which generates a network key update key which is impossible to generate from an address key which the address key allocation unit allocated to the client which is the target to be disconnected, encrypts a new network key using the generated network key update key, and distribute it to the clients via a network; and a client comprising: a network key decryption unit (for example, realized by a network key decryption unit 201) which, using the address key which is allocated to the address of the client and stored in advance, generates the same network key update key as the network key update key which the network key encryption unit generated, and decrypts the new network key which is distributed from the server using the generated network key update key.

(2) In the network key update system, the network key encryption unit may be structured such that: a group of clients sharing an address in one address space an element group (for example, (1-1, *, *)); a group of client which is specified by an intersection of an element group which extracted an address one each from a plurality of different address spaces respectively is a structured group (for example, (1-1, 2-q, *)); and repeats processing: to select, among the structured groups which do not include a client n which is a target to be disconnected, and under the condition to exclude a client for which a network key is already distributed, one structured group G with the largest number of elements; to generate a network key update key by a predetermined method from an address key (K(1-1), for example) which is made to correspond to an address shared by each client belonging to each element group whose intersection becomes the selected structured group G; to encrypt a new network key using the generated network key update key; and to distribute the encrypted new network key to a client included in the structured group G together with the information which specifies the structured group G; until distribution of the new network key to all the clients other than the client n which is the target to be disconnected is completed.

(3) In the network key update system, the network key encryption unit may be structured such that: a group of clients which is specified by an intersection of an element group which is extracted an address one each from one address space or i sets (i is the number of 2 or more) of different address spaces respectively is a structured group of order i in particular; selects, among the structured groups which include a client n which is a target to be disconnected and of which the order is a value which subtracted 1 from the number of whole address spaces, a structured group G' with the smallest number of elements; repeats processing: to select, among the structured groups which do not include clients included in the selected structured group G', and under the condition to exclude a client for which a network key is already distributed, one structured group G with the largest number of elements; to generate a network key update key by a predetermined method from the address key which is made to correspond to an address shared by each client belonging to an element group whose intersection becomes the structured group G; to encrypt a new network key using the generated network key update key; and to distribute the encrypted new network key to a client included in the structured group G together with the information which specifies the structured group G; until distribution of the new network key to all the clients other than the client included in the structured group G' is completed; and finally repeats processing: to select, among the structured groups included in the structured group G' and whose order becomes equal to the number of the whole address spaces, one structured group G" which do not include the client n which is the target to be disconnected from the network; to generate a network key update key by a predetermined method from the address key which is made to correspond to an address shared by each client belonging to an element group whose intersection becomes the selected structured group G"; to encrypt a new network key using the generated network key update key; and to distribute the encrypted new network key to only one client included in the structured group G" together with the information which specifies the structured group G"; until distribution of the new network key to the client included in the structured group G" other than the client n which is the target to be disconnected is completed.

(4) In the network key update system, the network key decryption unit may be structured such that: based on information which specifies the distribution destination included in the transmission data which the network key encryption unit distributes, and in case a client is included in the distribution destination, it generates a network key update key, using the address key which is stored in a memory unit (for example, realized by an address key memory unit 202), and which is made to correspond to the address capable of specifying the distribution destination, in the same method as the network key encryption unit; and using the generated network key update key, decrypts the encrypted new network key which is distributed by the server.

(5) In the network key update system, the address key allocation unit may be structured such that: it creates a plurality of address spaces in order to generate an identifier for identifying a client; under the condition that the client is uniquely identified by a combination of an address of the client in each address space, makes a correspondence of a unique address key for an address which is in each address space and of which the identifier for identifying the client includes; and allocates safely to each client all the address keys which are made to correspond to the address in each address space of which the identifier for identifying the client includes.

One exemplary advantage in each aspect of the present invention is, to be able to reduce the number of communications at the time of update of a network key and without depending on a key tree, to suppress degradation of the performance by the update.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-217801, filed on Sep. 18, 2009, the disclosure of which is incorporated herein in its entirety by reference.

INDUSTRIAL APPLICABILITY

The present invention can be applied to operations management of a wide area sensor network which collects in a large scale inspection information such as heart rate meter, a thermometer, an electricity meter and a gas meter. Also, the present invention can be applied not only in a sensor network but also in a network in which one server bears participation management of a large number of clients, for example, in an intra-enterprise network, for a use of disconnecting a client from the network.

DESCRIPTION OF THE REFERENCE NUMERALS

10 Network key update system
100 Server
101 Address key allocation unit
102 Address key memory unit
103 Network key encryption unit
200 Client
201 Network key decryption unit
202 Address key memory unit
300 Network
400 Non-transitory computer-readable recording medium.

The invention claimed is:

1. A server which, when a client is disconnected from a network, updates a network key which is used in order to participate in said network, and the server comprising:
an address key allocation unit which generates an identifier for identifying said client by a combination of addresses extracted from each of a plurality of any address spaces, one by one optionally, and allocates an address key respectively to each said address which said generated identifier includes; and
a network key encryption unit which:
generates a network key update key, to disconnect the client corresponding to said any address of said plurality of any address spaces, which is impossible to generate from the address key which said address key allocation unit allocated to each address which is an identifier of said client, which is targeted to be disconnected, is included based on said address key allocated to each address included in said identifier of a client which is not the target to be disconnected,
encrypts a new network key using said generated network key update key; and
distributes said encrypted new network key to the client via the network,
wherein:
a group of clients which include an address in one address space in one's own identifier is an element group and a group of clients which are specified by an intersection of the element group corresponding to an address which is extracted, one each from a plurality of different address spaces respectively, is a structured group;
said network key encryption unit selects, among the structured groups which do not include a client n which is a target to be disconnected, one structured group G with a largest number of elements, and generates said network key update key by a predetermined method from the address key which is made to correspond to the address corresponding to each element group respectively whose intersection is said selected structured group G; and
said network key encryption unit distributes said encrypted new network key to a client included in said structured group G.

2. The server according to claim 1, wherein said network key encryption unit repeats processing which: selects, among the structured groups which do not include the client n which is the target to be disconnected, and under a condition that clients for which a network key is already distributed are excluded, one structured group G with a largest number of elements; generates said network key update key by a predetermined method from the address key which is made to correspond to the address corresponding to each element group respectively whose intersection becomes said selected structured group G; encrypts a new network key using said generated network key update key; and distributes said encrypted new network key to a client included in said structured group G; until distribution of the new network key to all the clients other than the client n which is said target to be disconnected is completed.

3. The server according to claim 1, wherein a group of clients specified by an intersection of an element group corresponding to an extracted address which is extracted one each from i sets (i is the number of 1 or more) of different address spaces respectively is a structured group of order i;
said network key encryption unit selecting, among the structured groups which includes the client n which is the target to be disconnected and of which an order is a value which is 1 subtracted from the number of whole address spaces, a structured group G' with a smallest number of elements; and selecting, among the structured groups which do not include clients which are included in said selected structured group G and under a condition that clients for which a network key is already distributed are excluded, one structured group G with a largest number of elements.

4. The server according to claim 3, wherein said network key encryption unit repeats processing comprising: selecting, among the structured groups which include the client n which is the target to be disconnected and of which an order is a value which is 1 subtracted from the number of whole address spaces, a structured group G' with a smallest number of elements; selecting, among the structured groups which do not include clients which are included in said selected structured group G', and under a condition that clients for which a network key is already distributed are excluded, one structured group G with a largest number of elements; generating said network key update key by a predetermined method from the address key which is made to correspond to the address corresponding to the element group respectively whose intersection becomes said structured group G; encrypting a new network key using generated the network key update key; and distributing said encrypted new network key to a client included in said structured group G; until distribution of said new network key to all the clients other than the client included in said structured group G' is completed.

5. The server according to claim 4, wherein said network key encryption unit repeats processing comprising: selecting, among the structured groups included in said structured group G' and whose order is equal to the number of the whole address spaces, one structured group G" which do not include the client n which is the target to be disconnected from the network; generating said network key update key by a predetermined method from the address key which is made to correspond to the address corresponding to the element group respectively whose intersection becomes said selected structured group G"; encrypting said new network key using the generated network key update key; and distributing said encrypted new network key to a client included in said structured group G" together with information which specifies said structured group G"; until distribution of said new network key to the client included in said structured group G" other than the client n of said target to be disconnected is completed.

6. The server according to claim 1, wherein said address key allocation unit creates a plurality of address spaces in order to generate an identifier for identifying a client; and under a condition that, by a combination of an address of the client in each address space, said client is identified uniquely, a correspondence of a unique address key for an address which is in each address space and which the identifier for identifying said client includes; and allocates safely to each client all the address keys which are made correspond to the address in each address space of which the identifier for identifying said client includes.

7. A network key update system comprising a server and a client, wherein when disconnecting the client from a network, updating a network key which is used in order to participate in said network;

the server comprising:
an address key allocation unit which generates an identifier for identifying said client by a combination of addresses extracted from each of a plurality of any address spaces one by one optionally, and allocates an address key respectively to each said address which said generated identifier includes; and
a network key encryption unit which generates a network key update key, to disconnect the client corresponding to said any address of said plurality of any address space, which is impossible to generate from the address key which said address key allocation unit allocated to each address which an identifier of said client which is a target to be disconnected includes based on said address key which is allocated to each address which is included in said identified of a client which is not the target to be disconnected, encrypts a new network key using said generated network key update key and distributes said encrypted new network key to the client via the network; and the client comprising:
a network key decryption unit which, using the address key which is allocated to the address of said client and stored in advance, generates a same network key update key as the network key update key which said network key encryption unit generated, and decrypts said new network key which is distributed from said server using the generated network key update key;

wherein:
a group of clients which include an address in one address space in one's own identifier is an element group and a group of clients which are specified by an intersection of the element group corresponding to an address which is extracted, one each from a plurality of different address spaces respectively, is a structured group;
said network key encryption unit repeats processing which: selects, among the structured groups which do not include a client n which is a target to be disconnected, and under a condition that clients for which a network key is already distributed are excluded, one structured group G with a largest number of elements; generates said network key update key by a predetermined method from the address key which is made to correspond to the address corresponding to each element group respectively whose intersection becomes said selected structured group G; encrypts a new network key using said generated network key update key; and distributes said encrypted new network key to a client included in said structured group G; until distribution of the new network key to all the clients other than the client n which is said target to be disconnected is completed.

8. The network key update system according to claim 7, wherein:
a group of clients specified by an intersection of an element group corresponding to an extracted address which is extracted one each from i (i is the number of 1 or more) sets of different address spaces respectively is a structured group of order i; said network key encryption unit repeats processing comprising: selecting, among the structured groups which include the client n which is the target to be disconnected and of which an order is a value which is 1 subtracted from the number of whole address spaces, a structured group G' with a smallest number of elements; selecting, among the structured groups which do not include clients which are included in said selected structured group G', and under a condition that clients for which a network key is already distributed are excluded, one structured group G with a largest number of elements; generating said network key update key by a predetermined method from the address key which is made to correspond to the address corresponding to an element group respectively whose intersection becomes said structured group G; encrypting a new network key using the generated network key update key; and distributing said encrypted new network key to a client included in said structured group G; until distribution of said new network key to all the clients other than the client included in said structured group G' is completed; and repeats processing comprising: selecting, among the structured groups included in said structured group G' and whose order is equal to the number of the whole address spaces, one structured group G" which do not include the client n which is the target to be disconnected from the network; generating said network key update key by a predetermined method from the address key which is made to correspond to the address corresponding to an element group respectively whose intersection becomes said selected structured group G"; encrypting said new network key using the generated network key update key; and distributing said new network key encrypted to a client included in said structured group G" together with information which specifies said structured group G"; until distribution of said new network key to the client included in said structured group G" other than the client n which is said target to be disconnected is completed.

9. The network key update system according claim 7, wherein said network key encryption unit distributes said encrypted new network key together with information which specifies said structured group G to a client which is included in said structured group G; and
said network key decryption unit, based on the information which specifies the structured group G which is included in transmission data distributed by said network key encryption unit, and in case said client is included in said structured group G, using the address key which is made to correspond to the address which can specify a distribution destination and which is stored in a memory unit, generates said network key update key by a same method as said network key encryption unit, and using said generated network key update key, decrypts the encrypted new network key which is distributed by the server.

10. The network key update system according to claim 7, wherein said address key allocation unit creates a plurality of address spaces in order to generate an identifier for identifying a client; and under a condition that, by a combination of an address of the client in each address space, said client is identified uniquely, makes a correspondence of a unique address key for an address which is in each address space and which the identifier for identifying said client includes; and allocates safely to each client all the address keys which are made to correspond to the address which is in each address space and which the identifier for identifying said client includes.

11. A network key update method which, when a client is disconnected from a network, updates a network key which is used in order to participate in said network, and the network key update method comprising:
generating an identifier for identifying said client by a combination of addresses extracted from each of a plurality of any address spaces one by one optionally and allocating an address key respectively to each said address which said generated identifier includes; and
generating a network key update key, to disconnect the client corresponding to said any address of said plurality of any address space, which is impossible to generate from the address key which is allocated to each address which an identifier of said client which is a target to be disconnected includes based on said address key which is allocated to each address which is included in said identifier of a client which is not the target to be disconnected, encrypting a new network key using said generated network key update key, and distributing said encrypted new network key to the client via the network; wherein:
a group of clients which include an address in one address space in one's own identifier is an element group and a group of clients which are specified by an intersection of the element group corresponding to an address which is extracted, one each from a plurality of different address spaces respectively, is a structured group;
repeating processing which: selects, among the structured groups which do not include a client n which is a target to be disconnected, and under a condition that clients for which a network key is already distributed are excluded, one structured group G with a largest number of elements; generates said network key update key by a predetermined method from the address key which is made to correspond to the address corresponding to each element group respectively whose intersection becomes said selected structured group G; encrypts a new network key using said generated network key update key; and distributes said encrypted new network key to a client included in said structured group G; until distribution of the new network key to all the clients other than the client n which is said target to be disconnected is completed.

12. The network key update method according to claim 11, wherein a group of clients specified by an intersection of an element group corresponding to an extracted address which is extracted one each from i (i is the number of 1 or more) sets of different address spaces respectively is a structured group of order i;
repeating processing comprising: selecting, among the structured groups which includes the client n which is the target to be disconnected and of which an order is a value which is 1 subtracted from the number of whole address spaces, a structured group G' with a smallest number of elements; selecting, among the structured groups which do not include clients which are included in said selected structured group G', and under a condition that clients for which a network key is already distributed are excluded, one structured group G with a largest number of elements; generating said network key update key by a predetermined method from the address key which is made to correspond to the address corresponding to an element group respectively whose intersection becomes said structured group G; encrypting a new network key using the generated network key update key; and distributing said encrypted new network key to a client included in said structured group G; until distribution of said new network key to all the clients other than the client included in said structured group G' is completed; and repeating processing comprising: selecting, among the structured groups included in said structured group G' and whose order is equal to the number of the whole address spaces, one structured group G" which do not include the client n which is the target to be disconnected from the network; generating said network key update key by a predetermined method from the address key which is made to correspond to the address corresponding to an element group respectively whose intersection becomes said selected structured group G"; encrypting said new network key using the generated network key update key; and distributing said encrypted new network key to a client included in said structured group G" together with information which specifies said structured group G"; until distribution of said new network key to the client included in said structured group G" other than the client n of said target to be disconnected is completed.

13. The network key update method according to claim 11, wherein creating a plurality of address spaces in order to generate an identifier for identifying a client; under a condition that, by a combination of an address of the client in each address space, said client is identified uniquely, making a correspondence of a unique address key for an address which is in each address space and which the identifier for identifying said client includes; and allocating safely to each client all the address keys which are made to correspond to the address which is in each address space and which the identifier for identifying said client includes.

14. A non-transitory computer-readable recording medium recording a program which, when a client is disconnected from a network, updates a network key which is used in order to participate in said network, the program causing a computer to execute:
address key allocation processing which generates an identifier for identifying said client by a combination of addresses extracted from each of a plurality of any address spaces one by one optionally and allocates an address key respectively to each said address which said generated identifier includes; and
network key encryption processing which generates a network key update key, to disconnect the client corresponding to said any address of said plurality of any address space, which is impossible to generate from the address key which is allocated to each address which an identifier of said client which is target to be disconnected to each address which is included in said identifier of a client which is not the target to be disconnected, encrypts a new network key using said generated network key update key, and distributes said encrypted new network key to the client via the network;
in said network key encryption processing, by regarding a group of clients which include an address in one address space in one's own identifier as an element group and regarding a group of clients which are specified by an intersection of the element group corresponding to an address which is extracted, one each from a plurality of different address spaces respectively, as a structured group; repeating processing which: selects, among the structured groups which do not include a client n which is a target to be disconnected, and under a condition that clients for which a network key is already distributed are excluded, one structured group G with a largest number of elements; generates said network key update key by a predetermined method from the address key which is made to correspond to the address corresponding to each element group respectively whose intersection becomes said selected structured group G; encrypts a new network key using said generated network key update key; and distributes said encrypted new network key to a client included in said structured group G; until distribution of the new network key to all the clients other than the client n which is said target to be disconnected is completed.

15. A server which, when a client is disconnected from a network, updates a network key which is used in order to participate in said network, and the server comprising:
   address key allocation means for generating an identifier for identifying said client by a combination of addresses extracted from each of a plurality of any address spaces one by one optionally and allocating an address key respectively to each said address which said generated identifier includes; and
   a network key encryption unit which generates a network key update key, to disconnect the client corresponding to said any address of said plurality of any address space, which is impossible to generate from the address key which said address key allocation unit allocated to each address which an identifier of said client which is said target to be disconnected includes based on said address key which is allocated to each address which is included in said identifier of a client which is not the target to be disconnected, encrypts a new network key using said generated network key update key and distributes said encrypted new network key to the client via the network; wherein:
   a group of clients which include an address in one address space in one's own identifier is an element group and a group of clients which are specified by an intersection of the element group corresponding to an address which is extracted, one each from a plurality of different address spaces respectively, is a structured group;
   said network key encryption unit repeats processing which: selects, among the structured groups which do not include a client n which is a target to be disconnected, and under a condition that clients for which a network key is already distributed are excluded, one structured group G with a largest number of elements; generates said network key update key by a predetermined method from the address key which is made to correspond to the address corresponding to each element group respectively whose intersection becomes said selected structured group G; encrypts a new network key using said generated network key update key; and distributes said encrypted new network key to a client included in said structured group G; until distribution of the new network key to all the clients other than the client n which is said target to be disconnected is completed.

* * * * *